(12) United States Patent
Riepler

(10) Patent No.: US 7,338,066 B2
(45) Date of Patent: Mar. 4, 2008

(54) METHOD FOR PRODUCING A BOARD-LIKE GLIDING DEVICE, AND A BOARD-LIKE GLIDING DEVICE

(75) Inventor: Bernhard Riepler, Wagrain (AT)

(73) Assignee: ATOMIC Austria GmbH, Altenmarkt im Pongau (AT)

( * ) Notice: Subject to any disclaimer, the term of this patent is extended or adjusted under 35 U.S.C. 154(b) by 288 days.

(21) Appl. No.: 11/039,319

(22) Filed: Jan. 19, 2005

(65) Prior Publication Data

US 2005/0167948 A1 Aug. 4, 2005

(30) Foreign Application Priority Data

Jan. 30, 2004 (AT) ................................ A 137/2004

(51) Int. Cl.
*A63C 5/00* (2006.01)

(52) U.S. Cl. .................... 280/610; 280/601; 280/14.21

(58) Field of Classification Search ............... 280/610, 280/601–609, 14.21; 156/242, 245
See application file for complete search history.

(56) References Cited

U.S. PATENT DOCUMENTS

| | | | | |
|---|---|---|---|---|
| 4,848,784 A | * | 7/1989 | Scherubl .................... | 280/602 |
| 4,993,740 A | * | 2/1991 | Recher et al. ............... | 280/610 |
| 5,032,139 A | | 7/1991 | Recher et al. | |
| 5,160,158 A | * | 11/1992 | Scherubl .................... | 280/610 |
| 5,372,370 A | * | 12/1994 | Rohrmoser ................. | 280/610 |

(Continued)

FOREIGN PATENT DOCUMENTS

AT 396 345 B 8/1993

(Continued)

OTHER PUBLICATIONS

French Search Report.
Austrian Office Action w/English translation.

*Primary Examiner*—Christopher P. Ellis
*Assistant Examiner*—Katy Meyer
(74) *Attorney, Agent, or Firm*—Collard & Roe, P.C.

(57) ABSTRACT

The invention relates to a method for producing a board-like gliding device (1), in connection with which strength-related and decorative layers (2, 3, 4) are joined together to form a one-piece composite body (6) in a hot compression molding cycle by means of a heated-platen compression molding device (5), whereby a cover layer (10) and/or a coating (11) of the gliding surface are selected from at least partly transparent plastic material, and the side (15) of the cover layer (10) and/or coating (11) of the gliding surface facing the core (9) of the composite body (6), is joined by means of a transparent adhesive layer (17) with a background layer (16) forming the visual background of the cover layer (10) and/or coating (11) of the gliding surface. Before the thin, variably shaped background layer (16) is introduced in the molding process, a layer (21) structured by recesses (22) and/or elevations (23) is secured on the side (20) of the background layer (16) to be facing the core (6), whereby by application of pressure and heat in the course of the process in which the layers (2, 3, 4) are joined, the surface structure (25) of the structured layer (21) is at least partly permanently transferred to the variably shaped background layer (16). Furthermore, the invention relates to a board-like gliding device (1) produced accordingly.

11 Claims, 3 Drawing Sheets

U.S. PATENT DOCUMENTS

| | | | |
|---|---|---|---|
| 5,437,755 A * | 8/1995 | Lavorel et al. | 156/240 |
| 5,851,331 A * | 12/1998 | Grenetier et al. | 156/235 |
| 2006/0119077 A1 * | 6/2006 | Rott et al. | 280/610 |

FOREIGN PATENT DOCUMENTS

| AT | 006 071 | | 4/2003 | |
|---|---|---|---|---|
| DE | 37 38 040 | | 8/1988 | |
| DE | 41 41 686 | | 6/1992 | |
| DE | 102 43 310 | A1 | 4/2003 | |
| EP | 0 722 843 | | 7/1996 | |
| EP | 0 774 365 | A1 | 5/1997 | |
| EP | 0 811 401 | | 12/1997 | |
| EP | 0 850 785 | A1 | 7/1998 | |
| EP | 1 375 190 | | 1/2004 | |
| FR | 2 860 165 | | 9/2003 | |
| FR | 1375190 | A1 * | 1/2004 | 280/610 |

\* cited by examiner

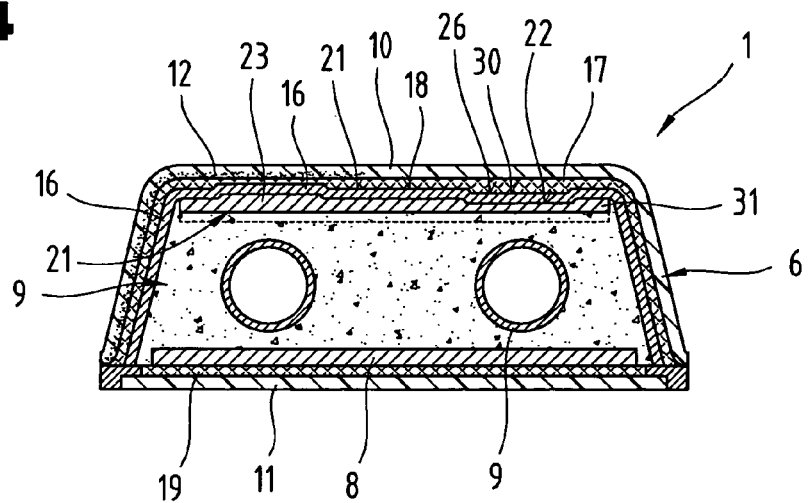
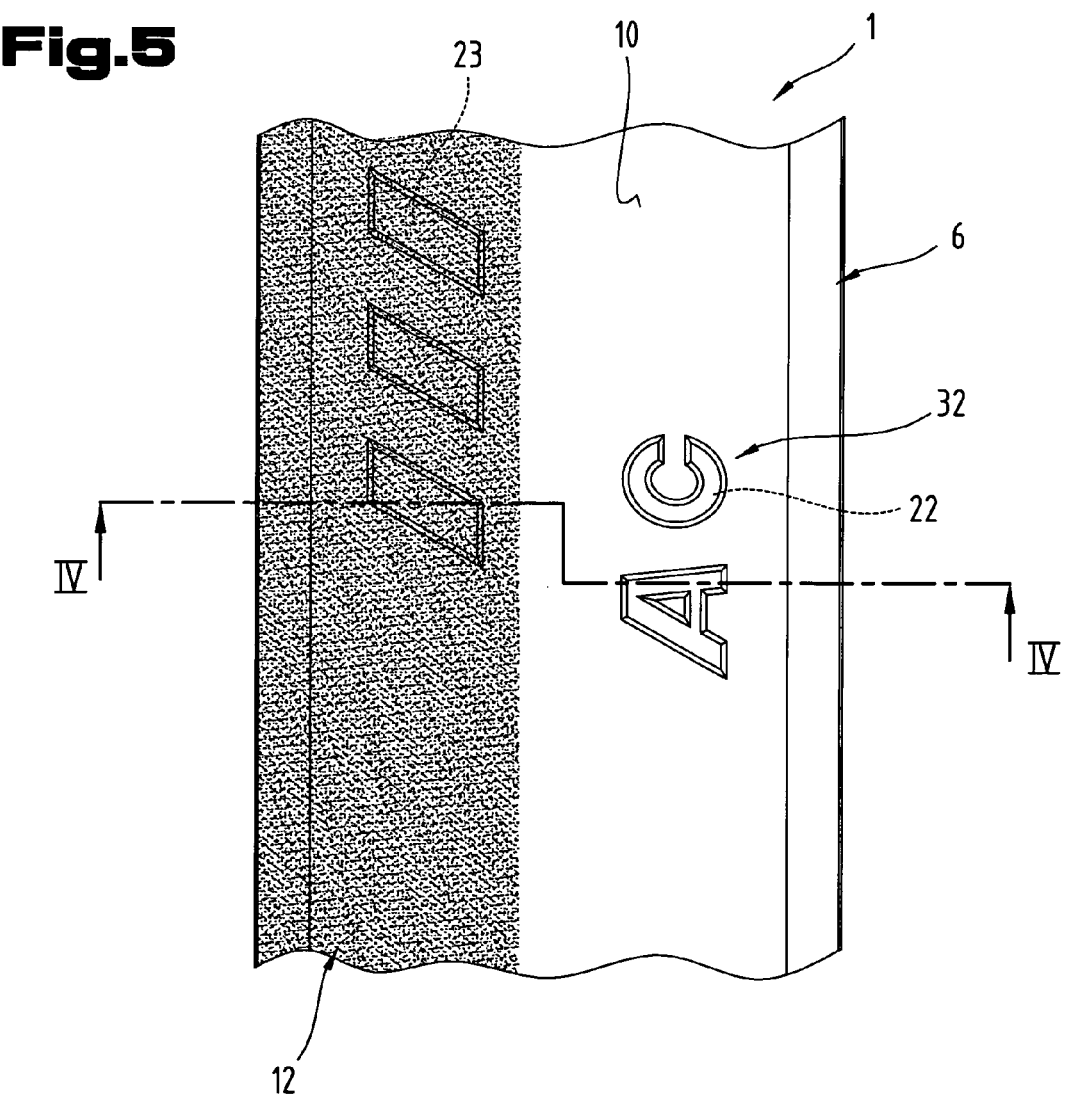

METHOD FOR PRODUCING A BOARD-LIKE GLIDING DEVICE, AND A BOARD-LIKE GLIDING DEVICE

CROSS REFERENCE TO RELATED APPLICATIONS

Applicant claims priority under 35 U.S.C. §119 of AUSTRIAN Patent Application No. A 137/2004 filed on Jan. 30, 2004.

BACKGROUND OF THE INVENTION

1. Field of the Invention

The invention relates to a method for producing a board-like gliding device, in which strength-imparting and decorative layers are joined together to form a one-piece composite body in a compression molding cycle by means of a hot-platen compression molding press, whereby a cover layer and/or a coating of the gliding surface consisting of an at least partly transparent plastic material are selected, and the side of the cover layer facing the core of the composite body and/or coating of the gliding surface are joined by means of a transparent adhesive layer with a background layer forming the visual background of the cover layer and/or coating of the gliding surface. Furthermore, the invention relates to a board-like gliding device, particularly a ski or snowboard comprising a plurality of decorative and strength-imparting layers arranged between a cover layer and a coating of the gliding surface, such layers forming a one-piece composite body comprising at least one core disposed between said layers, whereby the cover layer and/or the coating of the gliding layer are formed by at least partly transparent plastic materials, and the side of the cover layer and/or coating of the sliding surface facing the core, is joined by means of a transparent adhesive layer with a background layer forming the visual background of the cover layer and/or coating of the gliding surface.

2. The Prior Art

A process for producing a multi-layered composite body of the type of a ski, snowboard or skateboard is described in EP 0 850 785 B1. In said process, an outer decorative complex for the composite body is prefabricated, and said prefabricated decorative complex is subsequently joined with the actual or support-providing, reinforcing structure of the composite body. The connection between the decorative complex and the reinforcing structure is produced in said process during the hot compression molding cycle based on a thermosetting resin. The multi-layered, prefabricated decorative complex comprises a layer consisting of transparent plastic, which is imprinted on the backside with sublimable dyes. For the hot assembly, said imprinted plastic layer is glued to an optical contrast—providing foil with the help of an adhesive film, with a mesh being embedded between said contrast foil and the transparent outer plastic layer. Said measures are implemented in order to prevent the adhesive film from interfusing or creeping in the course of the heated-platen compression molding process, so that the printing dyes remain on the backside of the transparent plastic layer in the sites where they are intended to be located.

Furthermore, a process for producing board-like gliding devices in known from EP 0 774 365 B1, in which an outer multi-layered decorative complex is prefabricated and subsequently joined with the supporting structure of the board-like gliding device as well. For producing the decorative complex, a decoration is transferred to a transparent plastic layer by employing the method of imprinting it with sublimable dyes. A foil providing contrast is subsequently glued under heat and pressure to the surface of the plastic layer previously decorated with sublimation dyes. In order to obtain the final condition of this board-like article, said prefabricated, multi-layered decorative complex is then applied under heat and pressure to the actual reinforcing structure of the board-like gliding device, whereby the values of temperature and pressure acting on the complex are higher than those required for realizing the decorative complex. In the present case, the transparent outer plastic layer or sublimable dyes are subjected to thermal stress a number of times as well.

DE 102 43 310 A1 of the applicant firm of the present application describes a board-like gliding device where the external side of the decorative layer or the coating of the gliding surface is at least in part provided with a structured surface comprising a great number of recesses and elevations, whereby the depth of the recesses or height of the elevations is smaller than the thickness of the structured cover layer or structured coating of the gliding surface. Furthermore, a layer consisting of transparent plastic is proposed for forming the outer cover layer or coating of the gliding surface of the board-like gliding device, whereby at least one flat side has a structured surface at least in part, and the latter is provided for forming the outer side of the gliding device. A latticework or a fabric may be embedded in at least a part of said layer, and the areas between the elements of the lattice-work intersecting one another may result in recesses in the outer surface of the layer. In this connection, the latticework represents elements determining the structure of the outer cover layer. Such structures in the outer side of the cover layer are realized in that the plastic of the cover layer sinks in the viscous plastic state, filling at least partly the clear spaces or cavities between the elements of the lattice-work. Following cooling of the outer plastic layer, a cover layer of the gliding device with a finely structured surface is then obtained. The outer plastic layer is transformed into the viscous plastic state, so that it will be capable of sinking into the clear spaces or cavities of the latticework. This requires relatively high thermal stress acting on the outer cover layer.

SUMMARY OF THE INVENTION

The present invention is based on the problem of providing a method for producing a board-like or single-board-like gliding device that has a structured appearance and exhibits visually perceivable recesses or elevations in spite of smooth surfaces without subjecting the outer layers to any extensive heat treatment, and particularly without requiring thermal embossing of such surfaces.

The problem of the invention is solved in that before the thin background layer is incorporated, the form of said layer being variable, a layer structured by recesses and/or elevations is secured on the side of the background layer facing the core, and in that by applying pressure and heat as the layers are being joined, the surface structure of the structured layer is permanently transferred at least in part to the background layer having a variable form. Independently of the above, the problem of the invention is also solved by arranging a structured layer on the side of the thin, foil-like background layer facing the core, and in that the surface structure of the structured layer is at least in part permanently transferred to the top side of the background layer. One of the benefits resulting therefrom is that the overall thermal stress acting on the transparent cover layer and coating of the gliding surface is kept low. This has a favorable effect on the optical appearance, on the one hand, and particularly high transparency can be maintained, and, in addition, the mechanical properties of the cover layer or coating of the gliding surface are hardly impaired, on the other hand. Furthermore, changes in the colored pigments in the structure of the layer are negligible owing to the fact that the heated-platen compression molding process is carried out only once. It is advantageous, furthermore, that particularly thin background layers can be used as well, and that such thin background layers can nonetheless be processed and manipulated in a relatively effortless manner. In particular, the mechanical resistance and especially the ultimate tensile strength of the background layer are raised by the quasi-armored background layer. In addition, the risk of crumbling or formation of folds in the background layer is considerably lowered. It is particularly beneficial, furthermore, that the pressures and temperatures applied in the course of compression of the individual layers are utilized for transferring the surface structure of the structured layer into the background layer for permanently embossing it in the latter. In this way, board-like gliding devices are produced that have the visual appearance of a structured outer surface, whereby the outer surface of the cover layer, however, is realized absolutely smooth. It is beneficial, moreover, that such a structure may produce in the background layer a quasi optically disturbing note in the appearance of the gliding device, and may effect interesting plastic or stereoscopic effects. Furthermore, gliding devices with surface structures that are highly or extremely reshaped in terms of space, can be created in this manner without running the risk of crazing or crumbling occurring in the background layer.

It is advantageous, furthermore, that the adhesive layer disposed between the cover layer and/or coating of the gliding surface, and the variably shaped background layer, said layer of adhesive originally having an at least approximately constant thickness, is plasticized or softened in the course of the heated-platen compression molding process, and partly displaced, and thus has its thickness reduced in sections; and that the background layer, the latter having a changeable form, is displaced via the displaceable adhesive into recesses in the structured layer, because this creates prominent surface structures as the individual components of the composite body are being compressed with each other.

Owing to the fact that the variably shaped background layer is unstructured in its initial condition, and is joined with the structure-imparting or structured layer via an adhesive film before it is loaded in the heated-platen compression molding press, the manipulation of the background layer can be distinctly enhanced.

The optical appearance of the gliding device can be created in a simple manner in multifarious ways by virtue of the fact that before the compression molding process is carried out, the cover layer and/or coating of the gliding surface are provided in a sublimation process with an imprint in the form of a decoration, graphics, or a handwritten logo or signature.

Owing to the fact that the material of the variably shaped background layer and/or its layer thickness are selected in such a way that its resistance to deformation is lower than the resistance of the plasticized or softened adhesive to displacement; that the dimensions of the recesses and/or elevations of the structured layer are selected in such a way that while pressure is being applied to the background layer and/or structured layer and the flowable or displaceable adhesive, deformation or at least partial adaptation of the shape of the variable background layer to the surface structures of the structured layer will take place; and/or that the dimensional stability or hardness of the layer arranged on the side of the structure-providing layer disposed closest to the core, is selected higher than the dimensional stability or hardness of the adhesive layer arranged on the top side of the background layer in the plastic or softened condition of said adhesive layer during compression molding, or higher than the dimensional stability of the foil-like, variably shaped background layer and/or structure-imparting layer; and/or that the structure-providing layer is formed by a network or lattice work with a width of mesh width of greater than 1 mm, preferably of from 2 mm to 10 mm, particularly of 5 mm, prominent structures can be created in the background layer as the layers of the composite body are being joined with each other.

Due to the fact that the layer providing the structure is formed by a plate-like element preferably consisting of plastic comprising breakthroughs or recesses and/or elevations, it is possible to create in the background layer three-dimensional shapes that enhance the legibility or recognizability of the given layout of the design.

Owing to the fact that the foil-like, variably shaped background layer, which is originally smooth, is selected from an expandable material such as, for example metal or plastic, it is possible to produce gliding devices with an extensively reshaped surface, or with narrow surface radii and sharp-edged surface transitions without causing any tearing or crumbling of the background layer.

The special features of a board-like gliding device according to claim 12 are disclosed in the introductory part. The effects and benefits of a board-like gliding device as defined by the further developments of the invention according to claims 13 to 21 are disclosed in the following description.

Excessive stress in points of the thin background layer is avoided by the embodiment of the board-like gliding device where the structured layer is formed by a knot-free network or latticework, thus by threads of the network or rods of the latticework not superimposing one another.

An embodiment of the board-like gliding device where the structured layer is formed by a coarse- or wide-meshed fabric or fleece consisting of non-woven fibers, is beneficial as well, because layers providing a structure are obtained in this way at favorable cost.

Owing to the fact that the structured layer is formed by a carrier layer with solid particles, or particles embedded therein at least partly, with random distribution of such particles, the structure of the background layer can be varied in many different ways.

The legibility of markings or representations on the gliding device can be distinctly enhanced if the surface structure or the recesses and/or elevations of the structured layer are realized in the form of three-dimensional graphics, three-dimensional signatures, or in the form of any other three-dimensional design elements.

Impairment or destruction of the foil-like background layer can be avoided even in the presence of strong deformation of the gliding device by virtue of the fact that the background layer, in combination with the structured layer, exhibits increased ultimate mechanical tensile strength.

Finally, owing to the fact that the background layer exhibits increased light reflection and in particular has a metallically brilliant surface, and that it is formed by a metallic foil with a multitude of recesses and/or elevations defining the layer providing the structure, it is possible to create a conspicuous optical appearance of the gliding device.

BRIEF DESCRIPTION OF THE DRAWINGS

The invention is explained in greater detail in the following with the help of the exemplified embodiments shown in the drawings, in which:

FIG. 4 is a cross-sectional representation of a gliding board manufactured according to the method as defined by the invention, comprising alternative measures as defined by the invention; and FIG. 5 is a simplified top view of a longitudinal section of the gliding device according to FIG. 4.

DETAILED DESCRIPTION OF PREFERRED EMBODIMENTS

It is noted here by way of introduction that in the different embodiments described in the following, identical components are provided with identical reference numbers and identical component designations, whereby disclosures contained throughout the description are applicable in the same sense to identical components with the same reference numbers or same component drawings. Furthermore, data relating to position such as, for example top, bottom, lateral etc. selected in the description, relate to the directly described and shown figure, and are applicable in the same sense to the new position where any position has changed. Furthermore, individual features or combinations of features in the embodiments shown and described herein may per se represent independent inventive solutions, or solutions as defined by the invention.

Figure 1:
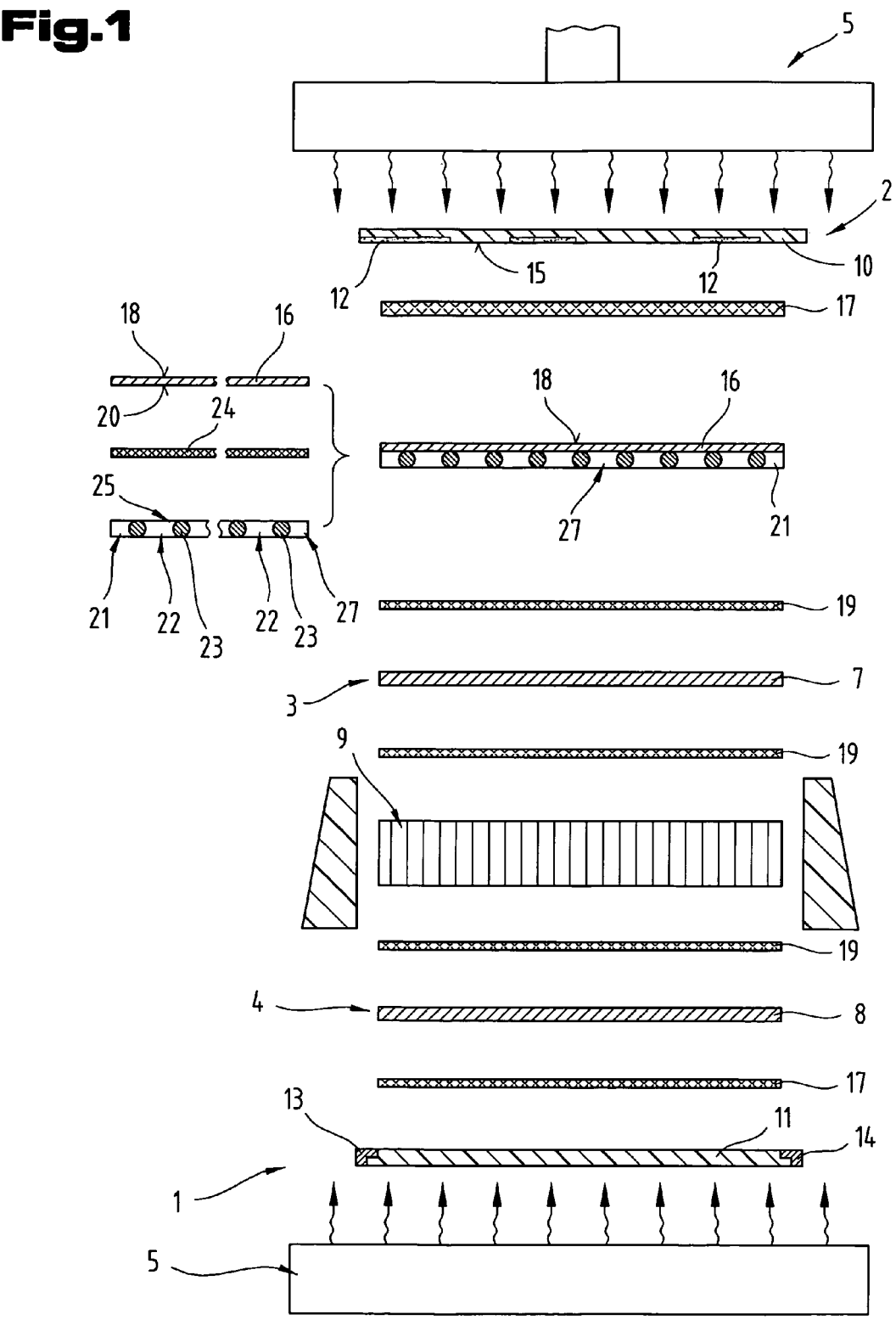
FIG. 1 is a simplified schematic representation showing a feasible method for manufacturing a board-like gliding device comprising the steps essential to the inventions.
Figure 2:
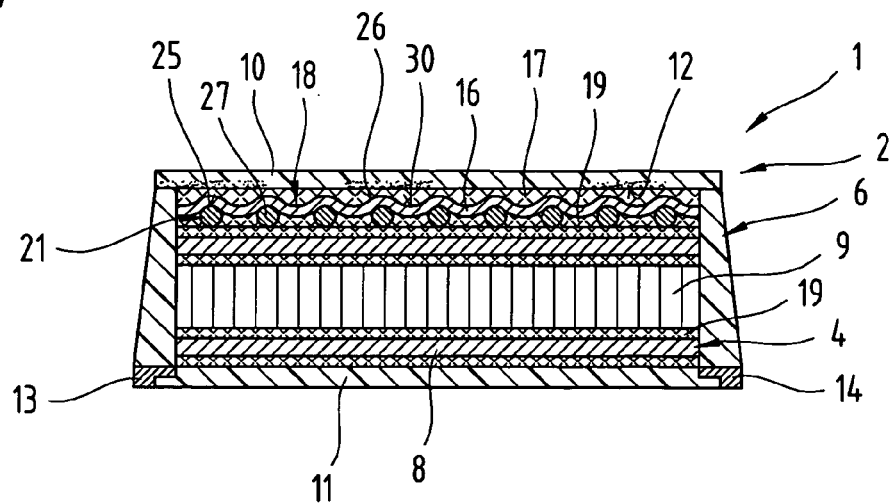
FIG. 2 is a cross-sectional representation of a board-like gliding device manufactured according to the method as defined by the invention.
Figure 3:
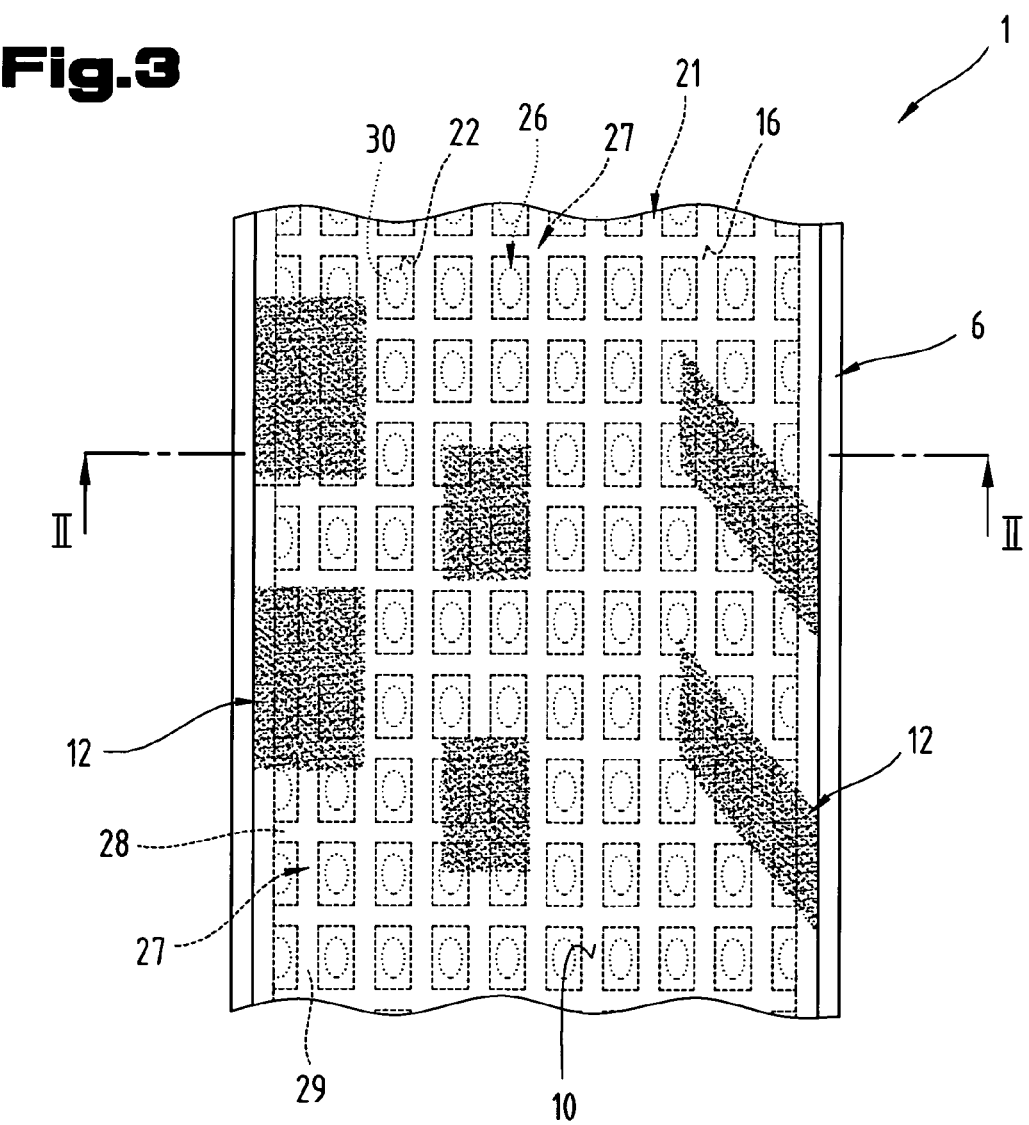
FIG. 3 is a simplified top view of a longitudinal section of the gliding device according to FIG. 2.

FIG. 1 shows a schematic representation of a feasible method comprising, among others, the steps for producing a board-like gliding device 1 as defined by the invention and as shown by way of extraction in FIGS. 2 and 3.

In this connection, FIG. 1 represents the manufacturing steps for producing a gliding device 1 as they are known from the prior art, for example by employing the sandwich construction technique. In this process, the layers 2, 3 and 4, which are relevant to the strength of the device and also decorative, are joined or glued together by means of a heated-platen compression molding device 5 in a hot pressing cycle for forming the one-piece composite body 6 (FIG. 2).

The layers 3 and 4 that are relevant to the strength, are essentially an upper belt 7 and/or a lower belt 8 for the composite body 6. Such a so-called "belted" construction may be formed in this connection by metallic layers and/or by a so-called "prepreg" in the form of resin-impregnated mats or the like. Depending on the desired mechanical properties such as, for example the deformation or strength properties, the device can be selectively produced with only an upper belt 7, or also with only a lower belt 8.

As it is known per se, at least one core 9 of the sandwich-like structured composite body 6 is formed between the upper belt 7 and the lower belt 8. Said core 9 may be formed in this connection by wood materials and/or plastic foam materials, as it is known per se.

In any case, a plastic material that is at least partially transparent is selected for the outer cover layer 10 and, if need be, for the coating 11 of the gliding surface. Before the manufacturing process for producing the composite body 6 is carried out, the cover layer 10 and/or the coating 11 of the gliding surface are provided on at least one flat side with a decoration or imprint 12 preferably by employing the sublimation method or thermodiffusion dyeing process, which is known from the prior art. For increased mechanical protection of the imprint 12, it is naturally useful to apply such an imprint to the backside of the cover layer 10 and/or coating 11 of the gliding surface.

If the composite body 6 is to be used as an alpine ski or snowboard, the lateral edge elements 13 and 14, which are preferably made of metal, may be associated with the coating 11 of the gliding surface. This is known per se in order to improve the guidance of the board-like gliding device on snow and ice. However, such edge elements 13 and 14 also can be omitted particularly in the production of cross-country skis.

In the production of a gliding device 1 as defined by the invention, at least the side 15 facing the core 9, i.e. the backside of the cover layer 10 and/or coating 11 of the gliding surface, is joined with a background layer 16 that is forming the visual background of the cover layer 10 and/or coating 11 of the gliding surface. Said background layer 16, which, in the exemplified embodiment shown, is provided and shown only for the transparent cover layer 10, thus represents the optical contrast for the transparent cover layer 10, and therefore substantially determines the external appearance of the board-like gliding device 1. Especially if it is arranged beneath the cover layer 10, said background layer 16 preferably extends over the entire top side of the gliding device 1. In case such a background layer 16 is arranged under the coating 11 of the gliding surface, such an optically contrasting layer also may extend only over part sections of the underside of the gliding device 1. So that the appearance of the background layer 16 is visually discernible, the lower side 15 of the cover layer 10 and/or coating 11 of the gliding surface, said side 15 being the side facing the center plane of the composite body 6, is joined with the background layer 16 by means of a transparent adhesive layer 17. In the starting or original condition as shown in FIG. 1, the adhesive layer 17 is formed by a flat, strip-like element made of transparent adhesive having the properties of a thermoplastic adhesive foil.

After the required lower layers 3, 4 for the gliding device 1 have been inserted, such layers being disposed near the bottom, and the background layer 16 has been introduced in the heated-platen compression molding device 5, said adhesive layer 17 is placed on the top side 18 of the background layer 16. Subsequently, the cover layer 10 forming the upper termination is placed on the top surface of the adhesive layer 17, and the one-piece composite body 6 is subsequently produced by activating the heated-platen compression molding device 5.

In said step or hot molding cycle in which the individual layers, i.e. the layers 2, 3 and 4 for the composite body 6 are joined, i.e., the individual layers 2, 3 and 4 are glued to one another by means of the additional adhesive layers 19, which may be transparent or also opaque, and may be formed, for example by resin adhesives or plastic foams such as, for example PU foam materials. In this connection, the number of adhesive layers 19 required depends upon the number of components or layers of the composite body 6, on the one hand, and the use of flowing plastic foam materials, which, if any are employed, are injected into the outer shell of the gliding devices, on the other hand.

Instead of employing the sandwich molding technique symbolically shown herein, it is possible also to build up or structure the composite body 6 by employing the foam injection method, which is known per se. In said process, the quasi outer skin or cover of the composite body 6 is built up first, and the core 9 of the composite body 6 is subsequently produced by injecting plastic foam, as it is shown in the following in connection with the exemplified embodiment according to FIG. 4.

It is important that before the background layer 16 is introduced or inserted, the side 20—which is the backside of the background layer 16 that is later to be associated with the core 9—is provided with the structured layer 21. In particular, before the background layer 16 is placed in the heated-platen compression molding press 5 or the halves of the mold, a structured layer 21 defined by the recesses 22 and/or elevations 23 is secured on the side 20 of the background layer 16, said side having to face the core 9. The structured layer 21 is preferably glued to the bottom side 20 of the background layer 16 by means of an adhesive film 24. In this connection, in the original or starting condition in which it is glued to the structured layer 21, the background layer 16 has a top side 18 that is plane or smooth to the highest possible degree, as shown in FIG. 1. The structured layer 21 represents in this connection a type of support element for supporting the background layer 16. Said background layer 16 thus may be particularly thin without being subject to any increased risk of suffering damage in the form of, for example crumbling or tearing or perforation or fracturing of the thin foil-like background layer 16. In particular, the background layer 16 may have a layer thickness of less than 0.1 mm, preferably of 0.01 mm to 0.05 mm, particularly of 0.02 mm. Said background layer 16, which is extremely thin as compared with the other layers 2, 3 and 4, is enhanced in this connection with respect to its mechanical properties by the structured layer 21 disposed underneath it, and particularly improved with respect to its strength or tearing properties. This means that particularly thin metallic foils made of, for example plastic or metal can be used for the background layer 16. Due to the fact that the amount of material required for the background layer 16 is low, the latter may be formed as well by relatively high-priced materials such as, for example metallic alloys and/or metal-pigmented plastics.

The thin, variably shaped background layer 16 that is provided on the backside with the structured layer 21, is then introduced in the heated-platen compression molding device 5 in the form of a component comprising at least two or three layers, and placed onto the upper belting of the composite body 6 to be formed as shown in FIG. 1. The background layer 16 is subsequently covered with the transparent adhesive layer 17, which in turn is covered with the transparent cover layer 10. The compression molding process is then started by heating the platens or halves of the mold of the compression molding device 5, and by closing and pressurizing the compression molding device 5, or at least one half of the mold.

It is important in this process that due the pressure and temperature acting on the various layers 2, 3, 4 as the composite body 6 is being compressed by the pressure exerted by the platens or mold, and/or the expansion pressure of the adhesion layers 17, 19, or of the plastic foam materials, the surface structure 25 of the structured layer 21 is at least in part permanently transferred to the variable shape of the background layer 16, i.e. that as the individual layers 2, 3, 4 of the composite body 6 are being pressed together and joined, the structured layer 21 is pressed into the previously or originally substantially plane background layer 16, and that imprints of the structures of the structured layer 21 are reproduced in this process on the top side 18 of the background layer 16. In particular, in the process of compression of the individual layers for producing the composite body 6, the thin foil-like background layer 16 is mechanically embossed, as this is symbolically shown in a highly simplified manner.

The contact pressure exerted between the background layer 16 and the structured layer 21 disposed underneath, is selected in this connection in such a way that tearing or flexing of the surface structure 25 through the background layer 16 is avoided.

This means that after the individual layers have been finally joined, the surface structure 25 of the structured layer 21 is reproduced on the top side of the background layer 16 in the form of the three-dimensional structure 26. Said structure 26 is produced particularly on account of the fact that the adhesive layer 17—which originally has an at least approximately constant thickness—is plasticized or softened in the course of the compression molding process, and that the thin, variably shaped background layer 16 is displaced by the now displaceable or liquefied adhesive of the adhesive layer 17 into the recesses 22 of the structured layer 21. It has to be particularly noted in connection with this method that the strip-shaped adhesive layer 17, which originally has an at least approximately constant thickness and is disposed between the cover layer 10 and/or coating 11 of the gliding surface, and the variably shaped background layer 16, is plasticized or softened during the compression molding process, and the adhesive is displaced at least in part, so that the thickness of the adhesive layer 17 is reduced and increased by sections as shown in FIG. 2.

In order to achieve prominent reshaping or embossing of the variably shaped background layer 16, the material selected for the latter may be of such quality, or its thickness may be so low that the resistance to deformation of the background layer 16 is lower than the resistance to displacement of the molten or viscous adhesive of the adhesive layer 17. However, the development of the three-dimensional structure 26 on the background layer 16 can be influenced also by dimensioning the recesses 22 and/or elevations 23 of the structured layer 21 sufficiently large in a way such that as pressure is exerted on the layers 3 to 5, and particularly on the structured layer 21 and the background layer 16, such pressure being dependent upon the flow property of the displaceable adhesive, deformation and an at least partial adaptation of the form of the variably shaped background layer 16 to the surface structures 25 of the structured layer 21 will occur.

Furthermore, for producing the prominent or stamped structures 26, it may be useful if the dimensional stability or hardness of those layers arranged on the side of the structure-providing layer 21 that is disposed closest to the core 9, is selected higher than the dimensional stability or hardness of the adhesive layer 17 arranged on the opposite top side 18 of the background layer 16 when said adhesive layer is in its plastic or viscous state in the course of the compression process, or selected higher than the dimensional stability of the foil-like, variable shaped background layer 16. This ensures that the pressure acting on the top side 18 via the adhesive layer 17 is higher than the counter pressure acting on the underside of the layer 21 that provides the structure, so that the structures 26 having the form of, for example troughs or hollows can form on the top side 18 of the background layer 16.

The originally at least substantially smooth, foil-like background layer 16, whose form is variable in the course of the molding process, may be formed by an at least slightly expandable material such as, for example a metal or plastic. This ensures that the foil-like background layer 16 is capable of adapting itself to the surface structure 25 of the structured layer 21 without destroying the thin background layer 16 by causing damage to it in the form of breakthroughs or crazing.

It is shown in FIGS. 1 to 3, furthermore, that the layer 21 providing the structure may be formed, for example by a network or latticework 27. Said latticework 27 preferably has a width of mesh of greater than 1 mm, preferably a width of mesh of 2 mm to 10 mm, particularly 5 mm. It is possible in this way that a multitude of three-dimensionally shaped recesses 22 and/or elevations 23 can develop in the top side 18 of the background layer 16, so that a prominent optical appearance is obtained in the result, which, due to a quasi optical note of disturbance or jarring element, permits obtaining a coating with small, individually appearing irregularities.

Like the background layer 16, the structured or structure-providing layer 21 preferably extends over the entire top side of the gliding device 1. Alternatively, the structured or structure-imparting layer 21 and the background layer 16 may superimpose or cover one another only in part sections, so that the background layer 16 is structured only in part, whereas adjacently disposed part sections remain smooth or plane.

In particular, individual part sections of the background layer 16 come to be situated within the recesses 22 of the structured layer 21 as the composite body 6 is being produced, which is mainly shown by the cross-sectional representation according to FIG. 2. Furthermore, said representation shows that after the structure-imparting or structured layer 21 has been integrated in the composite body 6 at the latest, it is completely glued to the entire surface area of the backside of the foil-like background layer 16 via the adhesive film 24 and/or adhesive layer 19.

It is shown most clearly in FIG. 3 that the cover layer 10 and, if need be, the coating 11 of the gliding surface may be provided with any desired type of decorative imprint 12 such as, for example graphics, a signature, a logo or some other markings. Such an imprint 12 is preferably produced with dyes capable of sublimation.

Preferably the backside of the cover layer 10 is likewise provided with a basic color consisting of sublimable dyes that determine the appearance of the gliding device 1. The colored appearance of the background layer 16 can be influenced in this way in a great variety of colored designs without subjecting the background layer 16 itself to coloration. In particular, the background layer 16 can be maintained with no change in its optics and appearance or color reflection inherent to whichever material is employed.

It has to be noted, furthermore, that even though the cover layer 10 and/or coating 11 of the gliding surface can be reshaped in the course of this manufacturing process, their respective outer surfaces remain smooth and unstructured.

Furthermore, it is shown in the best way by FIG. 3 that the structured or structure-imparting layer 21 may be formed by a knot-free network or latticework. Such a knot-free latticework 27 is comprised of the network threads and latticework rods 28 and 29, respectively, which do not superimpose each other, but extend at an angle in relation to one another. Since said latticework 27 per se is not directly visible when viewing the gliding device 1 from the top according to FIG. 3, where it is covered by the background layer 16, the latticework 27 is shown by broken lines. The tub-like troughs 30 developing in the recesses 22 or breakthroughs of the latticework 27, are illustrated by way of example by means of dotted ellipses. Such three-dimensional structures in the background layer 16 are superimposed by the imprint 12 or decoration in the transparent cover layer 10, so that an optically advantageous stereoscopic effect of the background layer 16 is obtained overall, with the layer 21 providing the structure being disposed underneath.

Similar effects can be achieved also with structured layers 21 that are formed by a wide-meshed fabric or fleece consisting of non-woven fibers. Also, the structured layer 21 may be formed by a carrier layer with solid particles or particles at least partly embedded therein with random distribution. Such solid particles may have, for example lenticular or spherical basic shapes.

The exemplified embodiment according to FIGS. 4 and 5 shows that the structured or structure-providing layer 21 may be formed also by a plate-like element 31 with the recesses 22 and/or elevations 23 and/or breakthroughs. Preferably, such a plate-like element 31 may consist of plastic or metal, and the breakthroughs or recesses 22 and/or elevations 23 can be worked into the top side of the plate-like element 31 by means of any desired method or technique. For example, the elements 31 can be produced by injection molding, milling, laser treatment, pressing, embossing and/or punching methods. Said element 31 will then represent the layer 21 providing the structure for the foil-like, thin background layer 16. The plate-shaped element 31 is again placed on the underside or backside of the foil-like background layer 16, whereby the foil-like decorative background layer 16, if possible, should cover the plate-like element 31 without any intermediate spaces and free of bubbles or air chambers or inclusions.

It is shown most clearly by FIG. 4 that the plate-like element 31 is present only, for example in the region of the top side of the gliding device 1, whereas the background layer 16 may extend over the side wings or lateral surfaces of the gliding device 1 as well.

Specifically said plate-like element 31 may have the recesses 22 and/or elevations 23 representing a signature 32, a logo or some other design elements. Said plate-like element 31 is particularly forming the structure-providing positive or negative reshaping element for the foil-like background layer 16.

It is shown most distinctly by FIG. 5 that it is thus possible to form the quasi three-dimensional signatures 32 or elevated and/or recessed design elements that can enhance the appearance and recognizability or distinctiveness of the gliding device 1.

According to an advantageous embodiment, the background layer 16 may have increased light reflection, which can be achieved, for example with a metallically brilliant surface of the background layer 16, or with layers of lacquer or other plastic layers.

Furthermore, it is important also that the thin, foil-like background layer 16, in combination with the structured and comparatively supportive and tearing-proof layer 21 disposed underneath, ensures increased ultimate tensile strength for the background layer 16, and in addition enhances the processing of the thin, foil-like background layer 16. In particular, with the method described herein, it is possible to produce also gliding devices 1 that have at least one groove-like recess extending on the top side in the longitudinal direction, or some other surface sections extending at an angle or with relatively sharp edges in relation to each other.

The various exemplified embodiments show possible design variations, whereby it is pointed out here that the invention is not limited to the design variations specifically shown herein, but that various combinations of the individual design variations among each other are feasible as well, and that based on the instruction for technical execution provided by the present invention, such variation possibility is well within the scope of the skill of the expert engaged in the present technical field. Therefore, all conceivable design variations feasible by combining individual details of the design variations shown and described herein, are jointly covered by the scope of protection as well.

Finally, in the interest of good order, it is emphasized that for the sake of superior understanding of the structure of the gliding device 1, the latter and its components are in part represented untrue to scale and/or enlarged and/or reduced in size.

Most important of all, the individual embodiments shown in FIGS. 1, 2, 3; 4, 5 may constitute the object of independent solutions as defined by the invention. The respective problems and solutions are disclosed in the detailed descriptions of said figures.

What is claimed is:

1. A method for producing a board-like gliding device comprising the steps of:
   (a) providing at least one decorative layer and at least first and second strength-related layers;
   (b) providing a core between the strength-related layers;
   (c) providing a cover layer and a coating of a gliding surface, at least the cover layer comprising an at least partly transparent material;
   (d) providing a variably shapeable background layer;
   (e) securing a structure-providing layer having a surface structure structured by at least one of recesses or elevations on a side of the variably shapeable background layer facing the core;
   (f) providing a transparent adhesive layer between the cover layer and the variably shapeable background layer; and
   (g) joining at least the at least one decorative layer, the first and second strength-related layers, the core, the cover layer, the coating, the variably shapeable background layer, the structure-providing layer, and the transparent adhesive layer together in a hot compression molding cycle via a heated platen molding device to form a one-piece composite body constituting the board-like gliding device;
   wherein the transparent adhesive layer joins the background layer with the cover layer to form a visual background for the cover layer; and
   wherein the surface structure of the structure-providing layer is at least partly permanently transferred to the background layer via pressure and heat acting on the structure-providing layer and the background layer while the at least one decorative layer, the first and second strength-related layers, the core, the cover layer, the coating, the variably shapeable background layer, the structure-providing layer, and the transparent adhesive layer are being joined during the hot compression molding cycle.

2. The method according to claim 1, wherein the adhesive layer originally has an at least approximately constant thickness and is plasticized or softened during the hot compression process, and partly displaced to reduce and increase the thickness in sections.

3. The method according to claim 1, wherein the structure-providing layer has recesses and the adhesive layer comprises a displaceable adhesive, said adhesive layer originally having an at least approximately constant thickness and said displaceable adhesive being plasticized or softened during the hot compression process, and wherein the variably shapeable background layer is displaced via the displaceable adhesive into the recesses of the structure-providing layer.

4. The method according to claim 1, wherein the variably shapeable background layer is unstructured in an initial condition and is joined with the structure-providing layer via an adhesive film before being introduced in the heated compression molding device.

5. The method according to claim 1, wherein prior to the heated compression molding process, the cover layer is provided in a sublimation process with an imprint comprising a decoration, graphics, or a signature.

6. The method according to claim 3, wherein the variably shapeable background layer is selected from such a material or with such a layer thickness that its resistance to deformation is lower than the resistance to displacement of the plasticized or softened adhesive.

7. The method according to claim 3, wherein pressure is exerted between the displaceable adhesive and at least one of the background layer and the structure-providing layer and the size of the dimensions of the recesses of the structured layer is selected in such a way that as pressure is being exerted, deformation or an at least partial adaptation of the form of the variably shapeable background layer to the surface structures of the structure-providing layer occurs.

8. The method according to claim 1, wherein the dimensional stability or hardness of a layer arranged on the side of the structure-providing layer disposed closest to the core, is selected higher than the dimensional stability or hardness of the adhesive layer arranged on the top side of the background layer when said adhesive layer is in its plastic or softened state in the hot compression process, or selected higher than the dimensional stability of the variably shapeable background layer.

9. The method according to claim 1, wherein the structure-providing layer is formed by a network or latticework with a width of mesh of greater than 1 mm.

10. The method according to claim 1, wherein the structure-providing layer is formed by a plate-like element comprising at least one of break-throughs, recesses or elevations.

11. The method according to claim 1, wherein the variably shapeable, originally smooth background layer comprises an expandable material.

* * * * *